United States Patent
Helm et al.

[15] 3,656,036
[45] Apr. 11, 1972

[54] DRIVE MECHANISM FOR AN ENVELOPE MACHINE

[72] Inventors: Herbert W. Helm, Hollidaysburg; Edgar V. Weir, Butler, both of Pa.

[73] Assignee: F. L. Smithe Machine Company, Inc., Duncansville, Pa.

[22] Filed: July 2, 1970

[21] Appl. No.: 51,764

[52] U.S. Cl. .................................................. 318/41, 318/85
[51] Int. Cl. .......................................................... H02p 5/46
[58] Field of Search ............................ 318/41, 42, 85, 112

[56] References Cited

UNITED STATES PATENTS

| | | | |
|---|---|---|---|
| 2,683,246 | 7/1954 | Priban | 318/112 |
| 2,476,873 | 6/1949 | Jeffers | 318/42 |
| 2,677,081 | 4/1954 | Montgomery, Jr. | 318/112 |
| 2,834,919 | 5/1958 | Malmros et al. | 318/42 |

*Primary Examiner*—Bernard A. Gilheany
*Assistant Examiner*—W. E. Duncanson, Jr.
*Attorney*—Stanley J. Price, Jr.

[57] ABSTRACT

Drive for an envelope machine is provided by a pair of wound rotor motors. The motors are mounted adjacent opposite ends of an envelope machine and are drivingly connected to different components of the envelope machine. The motors are electrically connected to each other to drive all of the envelope machine components in proper timed relation to each other to form envelopes from envelope blanks. The wound rotor motors have their stators connected in parallel and their rotors electrically connected to each other. A rotor circuit is provided and includes resistors and silicon controlled rectifiers. The silicon controlled rectifiers provide speed control for the motors by controlling the current flow through the resistors. A speed control circuit provides for stepless, smooth increase or decrease in the speed of the motors and of the envelope machine components driven thereby. The motors, because of the electrical connection of the rotors to each other, maintain the rotors in substantial alignment with little or no angular displacement between the rotors while the motors are running and driving the envelope machine components. A separate synchronization circuit is provided to rotate one of the rotors while the rotors are not connected to each other to position the rotors in substantial alignment. After the rotors are substantially aligned by the synchronization circuit, control relays are energized to close relay contacts and electrically connect the rotors to each other so that the rotors of the motors are first aligned with substantially no angular displacement therebetween. The speed of both motors may be changed by increasing or decreasing the amount of current flow through the resistors in the rotor circuit. Silicon controlled rectifiers in the rotor circuit control the amount of current flowing through the rotor circuit and the firing angle of the silicon controlled rectifiers is controlled by a separate speed control circuit. Safety circuits are provided to require the speed control circuit to be energized before the rotor circuit is closed. The resistors in the rotor circuit are positioned in the drier for the seal flap adhesive and provide a portion of the heat for the drier.

11 Claims, 2 Drawing Figures

Patented April 11, 1972

DRIVE MECHANISM FOR AN ENVELOPE MACHINE

BACKGROUND OF THE INVENTION

1. Field of the Invention

This invention relates to an electric motor drive arrangement for an envelope machine and more particularly to an envelope machine driven by a pair of separate wound rotor motors.

2. Description of the Prior Art

An envelope machine has a substantial number of components that perform specific operations on an envelope blank during the process of forming an envelope therefrom. The envelope blanks must be delivered to the components in accurate timed relation and the components must be driven at accurate predetermined speeds so that the envelope blank arrives at each component at the exact time that the component is positioned to perform the given operation on the envelope blank. For example, at the front end of the machine, the envelope blanks must be in proper position for the rotating knife or panel cutter to cut windows or panels in the blanks. The blanks must, thereafter be in proper position when the bottom seal score is impressed on the blank. The bottom seal score takes place after a substantial number of other intervening operations have been performed on the envelope blanks. Any substantial deviation in timing of the components relative to each other results in faulty envelopes being formed in the envelope machine.

The timing accuracy required between the components necessitated, in the past, that all of the components be mechanically connected or tied to or driven from a single power source. A mechanical drive for all of the components required a drive shaft extending from one end of the envelope machine to the other end. The sections of the machine had to be accurately aligned to minimize any angular deviation of the elongated drive shaft and deviations in angular velocity of the shaft. With all of the components mechanically connected, the operation of the selected group of components while the other components were inactive, required the sections to be mechanically disconnected. There is a need, therefore, for an envelope machine drive mechanism that eliminates the expensive, elongated drive shaft, the critical aligning of the machine sections and provides a simple method whereby certain of the components may be operated while other of the components are idle.

SUMMARY OF THE INVENTION

The present invention is directed to a drive mechanism for an envelope machine where a pair of motors are mounted on spaced sections of the envelope machine. One of the motors drives a first group of components on the envelope machine. The other motor drives another separate and different set of components on the envelope machine so that there is a separate drive for one set of components and a separate drive for the remaining components. There is provided a means to synchronize the pair of electric motors so that all of the components in both of the groups are driven in timed relation to the other components to form envelope blanks by serially subjecting said blanks to envelope forming operations by all of the components in one of the groups. The electric motors are wound rotor motors with their stators connected in parallel and their rotors electrically connected to each other. This arrangement provides angular alignment of the rotors so that the electric motors drive all of the components in both of the groups in timed coordinated relation. A separate synchronizing means is provided to measure the angular deviation between the rotors while the rotors are not connected to each other and a means is provided to rotate one of the rotors until the rotors are in substantial angular alignment. The rotors of the wound rotor motors are connected to resistors in the heater element for the adhesive drier to provide heat for the adhesive drier. A speed control circuit is provided that includes a potentiometer connected through a switching reactor or magnetic amplifier and a pulse transformer to the gates of silicon controlled rectifiers in the rotor circuit. The speed control circuit controls the firing angle of the silicon controlled rectifiers that are connected in the rotor circuit with the speed control resistors.

Accordingly, the principal object of this invention is to eliminate the mechanical connection between all of the components of an envelope machine and the elongated drive shaft associated with such a connection.

Another object of this invention is to eliminate the accurate alignment of the sections of the envelope machine as required when all components are mechanically connected.

A further object of this invention is to provide means for driving a plurality of machine components while the other components are idle and inactive.

These and other objects and advantages of this invention will be more completely disclosed and described in the following specification, the accompanying drawings and the appended claims.

DESCRIPTION OF THE PREFERRED EMBODIMENT

Figure 1:
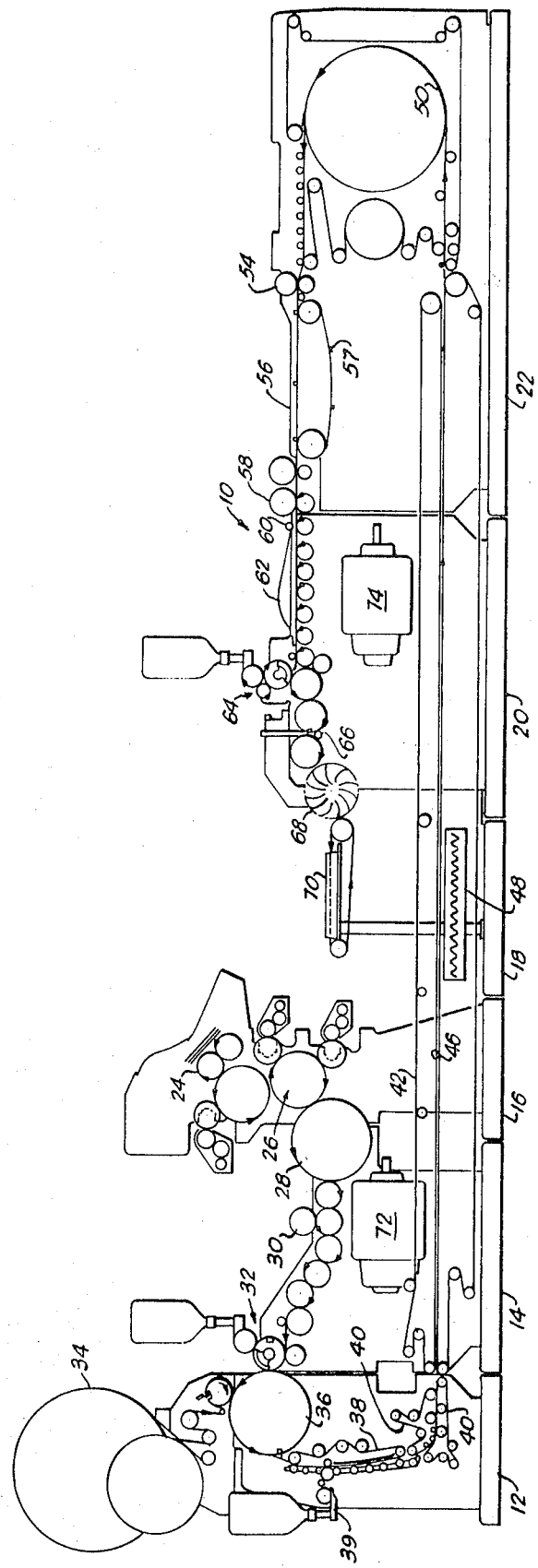
FIG. 1 is a schematic view in side elevation of an envelope making machine having a pair of drive motors.

Referring to FIG. 1 there is illustrated schematically an envelope making machine generally designated by the numeral 10 that may be conveniently divided into several sections. At the front of the machine there is a collator section 12, a panel cutter section 14 and a feeder printer section 16. The rear part of the machine has a drier delivery section 18, a folder section 20 and an aligner section 22. The envelope blanks are stacked adjacent the rotary feeder 24 and fed into a printing unit 26 where the blanks may be printed on both the inside and the outside surfaces The blanks are transferred by means of transfer cylinder 28 to a window or panel cutting mechanism 30 positioned on the panel cutter section of the machine. After the panels or windows are cut in the envelope blank, the blank is then conveyed to a patch gummer 32 where adhesive is applied to the blank around the window formed therein.

Glassine windows are cut from the web of glassine 34 and positioned in overlying relation with the window and adhesively secured thereto on the collator roll 36. The blanks are thereafter positioned in overlapped relation in the collator section 12 and fed by endless tape type conveyors 38 past a seal gummer 39. Adhesive is applied to the seal flap portion of the overlapped blanks and the blanks are conveyed by the endless conveyor to a second tape conveyor 40. The overlapped blanks with the wet adhesive applied thereto are separated slightly by the endless tape conveyor 40 to prevent adjacent blanks from adhering to each other by the continuous application of adhesive to the seal flap portions of the overlapped blanks. The blanks, however, remain in overlapped relation. The overlapped blanks are introduced between a pair of endless chains 42 and 44. The endless chains 42 and 44 have conveying reaches in abutting relation to form a chain conveyor 46 that extends from the panel cutter section 14 to the aligner section 22. The chain conveyor 46 conveys the envelope blanks with the wet adhesive on the seal flaps through the delivery drier section 18 where the blanks are subjected to an elevated temperature from the seal flap adhesive drier 48.

The envelope blanks are thereafter transferred from the chain conveyor 46 to an endless belt conveyor 50 that conveys the overlapped envelopes to pull-out rolls 54. The pull-out rolls 54 separate the envelope blanks and introduce the blanks to an aligner 56 where aligner chains 57 position the blanks transversely and convey the blanks to a bottom and seal scorers 58. A side score is applied to the blanks after the bottom and seal scores by a side scorer 60. A pair of plowshares 62 fold the side flaps of the envelope blank and gum is applied to the back of the side flaps by the gummer 64. A seal folder 66 folds the bottom flap and the seal flap and the completed envelope is delivered by means of delivery wheel 68 to table 70. It will be appreciated from the above description that the number of operations that must be serially performed on an envelope blank and the operations must be performed in timed relation to the previous operation. Accurate timed positioning of the various cutting or scoring elements of the components is essential, as for example, the bottom seal scorer, the panel cutter and the patch gummer must be in scoring or cutting position when the blank is in position to be scored or cut. It is essential that the components of the machine be accurately connected for timed operation.

Drive for the envelope machine is provided by a pair of wound rotor motors. A front wound rotor motor 72 is mounted in the panel section of the envelope machine and is arranged to drive the components associated with the collator section 12, panel cutter section 14 and feed printer section 16 with the exception of the endless tape conveyors 40 and the endless chains 42 and 44 that form the chain conveyor 46. A rear wound rotor motor 74 is suitably mounted in the folder section 20 and is arranged to drive the components mounted on the delivery section 18, folder section 20 and aligner section 22 and, in addition the endless tape conveyors 40 mounted on the collator section 12 and the endless chains 42 and 44 extending from the panel cutter section 14 to the aligner section 22. The rear drive motor 74 is mechanically connected to the chains 42 and 44 of chain conveyor 46 to drive the chain conveyor 46. The endless tape conveyors 40 are driven by the chain conveyor 46 so that both conveyors are driven by the rear motor 74. The two driving sections are split between the seal flap gummer tape conveyor 38 and the subsequent tape conveyor 40 for convenience in that the envelope blanks are in overlapped relation for seal gumming and drying. If a slight out-of-phase condition should occur between the front motor 72 and the rear motor 74, this would not affect substantially the overall operation of the envelope machine since the pull-out segments 54 in the aligner section 56 would make the necessary corrections in the re-alignment of the envelope blank.

The wiring for the various sections is provided in a trough extending along the base of the envelope machine 10 and is not illustrated in detail. The method by which the two wound rotor motors are mounted in the panel cutter section 14 and folder section 20 is not illustrated in detail. Any conventional mounting means may be employed for the motors 72 and 74. The mechanical connections between the respective motors 72 and 74 and the previously described components have not been illustrated nor described. Any suitable mechanical connecting means between the rear drive motor 74 and the components in the folder, aligner and delivery sections 20, 22 and 18 may be employed. Similarly, any suitable mechanical connecting devices may be employed between the motor 72 and the components previously discussed in the feeder printer section 16, panel cutter section 14 and collator section 12 with the exception of conveyors 40 and chain conveyor 46. As previously stated, the tape conveyors 40 and chain conveyor 46 are for convenience driven by the rear drive motor 74.

Figure 2:
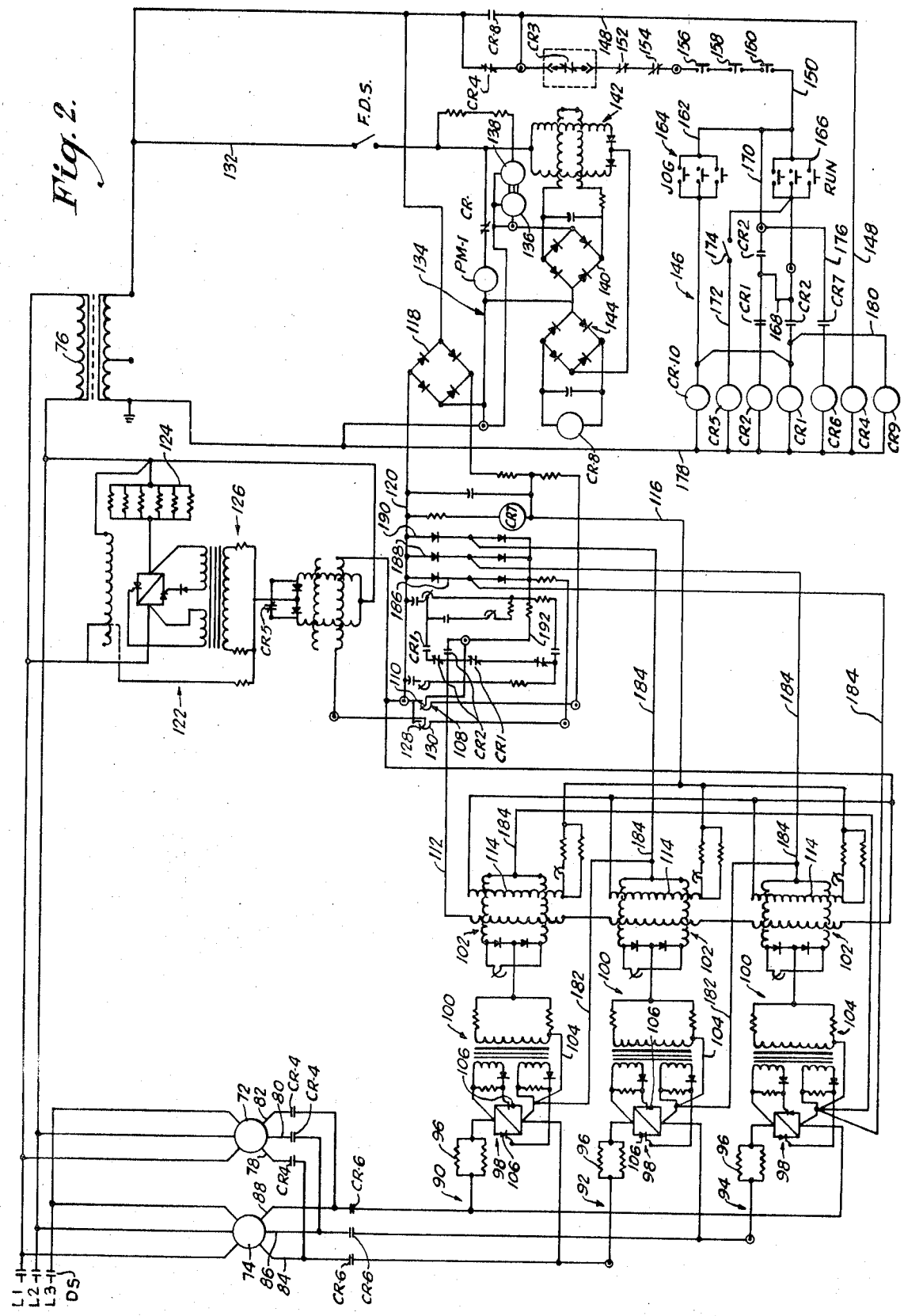
FIG. 2 is a wiring diagram of pertinent portions of the circuits for maintaining the rotors in synchronization, separately synchronizing the rotors and for changing the speed of the motors.

Referring to the circuit diagram, FIG. 2, the front and rear wound rotor motors 72 and 74 are connected in parallel to a source of three phase alternating current in lines L1, L2 and L3. Suitable disconnect switches DS are positioned in the lines L1, L2 and L3. Also connected across the lines L1 and L2 is a transformer 76 for reducing the line voltage to various control circuits. The rotor of front motor 72 has leads or lines 78, 80 and 82 extending therefrom that are connected to lines 84, 86 and 88 extending from the rotor of rear motor 74. With this arrangement, the rotors of motors 72 and 74 are electrically connected to each other when normally open contacts CR4 in lines 78, 80 and 82 are closed by a control relay CR4. The lines 84, 86 and 88 extending from the rotor of motor 74 form part of separate rotor circuits 90, 92 and 94. The lines 84 and 88 are in circuit 90, the lines 84 and 86 are in circuit 92, and the lines 86 and 88 are in circuit 94. Each of the circuits 91, 92 and 94 has connected therein in series a pair of resistors 96 and a pair of silicon controlled rectifiers 98. The resistors 96 draw current from the rotors and are preferably positioned in the adhesive drier 48 illustrated in FIG. 1. The pair of SCRs 98 provides a current flow control means to control the amount of current flowing through the circuits 90, 92 and 94 and thus control the speed of the motors 72 and 74. Normally open relay contacts CR6 positioned in lines 84, 86 and 88 are arranged to maintain the rotor circuits 90, 92 and 94 open and the motors idle until control relay CR6 closes the normally open contacts. As later discussed, with contacts CR4 in lines 78, 80 and 82 open and normally open contacts CR6 in lines 84, 86 and 88 closed, the rear motor 74 may be actuated to drive the envelope machine components connected to rear motor 74 while the components driven by the front motor 72 are idle.

Speed control circuits generally designated by the numeral 100 are provided to regulate or control the firing angle of the silicon controlled rectifiers 106 which, in turn, control the flow of current through the respective rotor circuits 90, 92 and 94. The speed control circuits 100 include a magnetic amplifier 102 connected to a pulse transformer 104. The output coils of the pulse transformer 104 are connected through diodes to the gates of the respective silicon controlled rectifiers 106. With this arrangement, the speed control circuits 100 through the magnetic amplifier 102 and pulse transformer 104 control the firing angle of the silicon controlled rectifiers 106 of circuits 90, 92 and 94 to thereby control the amount of current flowing through the silicon controlled rectifiers 106 in the respective circuits 90, 92 and 94.

A motor speed control potentiometer 108 has a wiper arm 110 connected to the input coils of the magnetic amplifiers 102. By thus changing the position of the wiper arm 110 on the resistor potentiometer 108 a preselected voltage is provided through line 112 across the input coils of the magnetic amplifiers 102 to thus provide a signal through the pulse transformers 104 to the gates of the silicon controlled rectifiers 106 in the rotor circuits 90, 92 and 94. The signal provided is proportional to the preselected speed determined by the relative position of the wiper arm 110 of potentiometer 108.

There is provided a bias circuit that includes bias coils 114 connected in series across the magnetic amplifiers 102. The bias circuit has a control relay CR7 in line 116 that closes normally open contacts CR7 in the safety circuit when there is a bias voltage across the biasing coils of the magnetic amplifier 102.

Direct current is supplied from a rectifier bridge 118 to both the speed control potentiometer 108 and to the biasing circuit through line 120. The biasing circuit is arranged so that there is a biasing voltage across the coils 114 of the magnetic amplifiers 102 when the control relay CR7 is energized. The control relay CR7 must be energized before the contacts CR6 in lines 84, 86 and 88 are closed to complete the rotor circuits 90, 92 and 94, as will be later described.

The bias circuit provides a negative control on the magnetic amplifiers 102 of speed control circuits 100 and provides a negative signal through the pulse transformer 104 to open the gates of SCRs and prevent the flow of current through the rotor circuits. In order to close or partially close the SCR gates, a positive signal through the input coils of magnetic amplifier 102 is required to provide for flow of current in the rotor circuits and for torque on the motors.

A heater circuit generally designated by the numeral 122 is connected across the lines L2 and L3 to provide current for the quartz lamp type resistors 124 positioned in the drier 48. A heat intensity control generally designated by the numeral 126 and similar to the speed controls 100, controls the firing angle of silicon controlled rectifiers in the heater circuit 122. The intensity control 126 for the resistors 124 includes a preselected voltage from the resistor of potentiometer 130 through wiper arm 128. The relative position of the wiper arm 128 on potentiometer 130 thus regulates the voltage and the maximum heat intensity of the drier at the maximum speed of the machine. The heat intensity of the resistors 124 varies with the speed of the conveyor 46 through the combining of a rotor feedback voltage with the heat intensity circuit voltage from potentiometer 130. This combined voltage provides a signal through the magnetic amplifier and pulse transformer to the silicon controlled rectifiers to regulate the current flowing through the heater resistors in proportion to machine speed. The heat intensity control circuit is described in detail in an application entitled "Method and Apparatus for Controlling the Heat Intensity of an Envelope Machine" filed of even date herewith and assigned to the assignee of the present invention.

A line 132 is connected to one side of a synchronizer circuit generally designated by the numeral 134. A forward disconnect switch FDS is positioned in line 132 and is arranged to complete the circuit 134 to rotate a rotor of one of the wound rotor motors until the rotors are aligned. When the disconnect switch FDS is open, as later explained, the rear motor 74 may be energized while the front motor 72 remains idle. There is provided a pair of selsyn type synchronizers 136 and 138 in circuit 134 that have their stators electrically connected to each other and their rotors mechanically connected through timing belts to the rotors of motors 72 and 74. Current is supplied to the rotor of selsyn motor 138 and the rotor is energized. When the synchronizer rotors are angularly displaced from each other, a voltage is generated in the rotor of selsyn 136. The output voltage of the rotor of selsyn 136 is proportional to the angular displacement of the rotors of the wound rotor motors 72 and 74. The synchronizers or selsyns 136 and 138 are thus arranged to indicate angular displacement of the rotor motors 72 and 74 by generating a voltage signal when the wound rotor motors are angularly displaced from each other. The voltage signal is proportional to the angle of displacement of the respective rotors. When the rotors are aligned with substantial zero angular displacement therebetween, the voltage generated by the rotor of selsyn 136 also approaches zero.

There is provided a pulse motor PM1 in the synchronizing circuit 134 that is arranged to jog the rear motor 74 and rotate the rotor of rear motor 74 until the voltage generated by the selsyn synchronizers 136 and 138 is zero. A bridge rectifier 140 has terminals connected to a magnetic amplifier 142 and to the rotor of selsyn 136. Another rectifier 144 has a control relay CR8 connected across a pair of terminals. The magnetic amplifier 142 with a voltage across the coils from the rotor of selsyn 136 maintains the control relay CR8 deenergized or off and prevents the relay from closing normally open contacts CR8 in another portion of the circuit. When the voltage generated by the rotor of selsyn 136 is zero, the voltage across the coils of the magnetic amplifier is removed and the rectifier 144 energizes the control relay CR8. With this arrangement when the voltage generated in the rotor of the synchronizer 136 is zero, the rotors of the wound rotor motors 72 and 74 are aligned and the control relay CR8 is energized. The control relay CR8 in turn closes contacts CR8 in line 148 to energize control relay CR4. The relay CR4 in turn closes contacts CR4 in lines 78, 80 and 82 to electrically connect the rotors of the wound rotor motors 72 and 74 to each other. The rotors are not, however, electrically connected to each other until they have been positioned in substantial alignment by the synchronizers in circuit 134. This prevents a shock load being applied to the motors and the envelope machine when the rotors are electrically connected to each other. When the rotors of wound rotor motors 72 and 74 are electrically connected to each other they rapidly align and it is essential to prevent the above discussed shock loads on the motors and the envelope machine to have the rotors in substantial alignment before they are electrically connected to each other.

A safety circuit generally designated by the numeral 146 is connected by liens 148 and 178 to the output coil of transformer 76. The circuit 146 has normally open contacts CR8 in line 148 that are closed by the control relay CR8 in the synchronizer circuit 134. The line 148 also has the control relay CR4 therein in series with the contacts CR8 so that the control relay CR4 is energized when the normally open contacts CR8 are closed. A by-pass line 150 is connected to line 148 and has included therein in series normally closed contacts CR4; normally closed contacts CR3 for a feeler control circuit; normally closed contacts 152 and 154 associated with the overload relays of the motors 72, 74 and three manually operated switches designated 156, 158 and 160. Before the motors 72 and 74 can be energized, the switches 156, 158 and 160 must be closed.

A line 162 is connected to line 150 and includes a jog push button or switch 164 and a control relay CR10. The line 150 also includes a run push button or switch 166; normally open contacts CR2 and control relay CR1, all connected in series. Line 168 connects line 150 to line 170 and line 170 has normally open contacts CR2 and CR1 and control relay CR2 positioned therein in series. A line 172 is connected to the line 150 on the output side of run push button or switch 166 and has a control relay CR5 and a drier switch 174 therein. A line 176 is connected to line 170 and includes normally open contacts CR7 and the control relay CR6. The circuit return line 178 is connected to lines 162, 172, 170, 150, 176 and 148. A time delay relay CR9 is connected by means of line 180 to the line 150 between control relay CR1 and normally open contacts CR2.

The rotor circuits 90, 92 and 94 have voltage feed-back circuits that include a line 182 connected to the respective circuit on the input side of the SCR bridge 98. The lines 182 are connected to lines 184 that are in turn connected at one end to the respective magnetic amplifiers 102 and at the other end to lines 186, 188 and 190 in the speed control circuit. The lines 186, 188 and 190 are in turn connected to line 192 that has wiper arm 110 of speed control potentiometer 108 connected thereto. With this arrangement, the speed control circuit is self-regulating in that an increase in voltage is provided for the speed control circuit as the motor speed is reduced due to increased torque on the motors. The voltage is provided through the resistor circuit where the rotor circuit voltage is proportional to motor speed. Thus, any decrease in speed of the motors 72 and 74 due to increased torque causes an increase in rotor voltage which, in turn, increases the speed control voltage to provide a signal to the speed control circuits to increase the speed of the motors and compensate for the speed lost through increased torque.

The above described circuits provide a two motor synchronized drive arrangement for the envelope machine where the rotors are first synchronized by a separate synchronizing means and then the rotors are electrically connected to each other to prevent substantial angular displacement between the rotors of the drive motors. There is also provided an accurate, stepless speed control for the motors that permits accurate control of the machine speed. A voltage feed-back is provided for self-regulation of the motor speed under different torque conditions. A biasing means is provided to prevent the energization of the motors until the speed control circuit is energized. Suitable connections are provided to disconnect the front motor 72 and run the rear motor 74 and thus operate the components driven by the rear motor while the remaining components driven by the front motor remain idle.

The drive for the envelope machine 10 operates as follows. The line disconnect switches DS are closed to provide three phase alternating current through the lines L1, L2 and L3. The stop, the on and the safe switches 156, 158 and 160 are closed. This provides a current through line 148 to by-pass line 150 and if the feeler controls are closed and the motor overload relays are closed, the current flows through line 150 and through line 170 and line 176. The normally open contacts CR7 in line 176 are open and if current is flowing through the rectifier 118 to the speed control circuits 100 and there is a bias voltage across the coils 114 in the magnetic amplifiers 102 the control relay CR7 is energized. Control relay CR7 closes normally open contacts CR7 to complete the circuit to relay CR6. Control relay CR6 closes normally open contacts CR6 in lines 84, 86 and 88 to thus complete the rotor circuits 90, 92 and 94 for the rear motor 74. The rear motor 74 can now be driven independently of front motor 72.

When it is desired to energize both motors to run all of the components of the envelope machine, the forward disconnect switch FDS in line 132 is closed to provide current for the sychronizer circuit 134. The synchronizers 136 and 138 that are mechanically connected to the rotors of drive motors 72 and 74 indicate the degree of angular displacement between the respective motors by the voltage generated by the rotor of synchronizer 136. Where there is an angular deviation between the rotors of motors 72 and 74, the pulse motor PM1 is energized to rotate the rotor of one of the motors 72 or 74 until the rotors are in substantial alignment. When the rotors are in substantial alignment with little or no angular deviation therebetween, the control relay CR8 is energized to close normally open contacts CR8 in line 148. When the contacts CR8 are closed the control relay CR4 is energized to close the normally open contact CR4 in the lines 78, 80 and 82. The closing of the contacts CR4 electrically connects the rotors of motors 72 and 74 to each other so that the rotors remain in substantial angular alignment relative to each other.

To run the machine, both the run and jog switches 166 and 164 are closed to energize the control relay and to open or close the contacts associated with various relays. The speed of the motors 72 and 74 is controlled by movement of the wiper arm 110 on the resistor of potentiometer 108. This regulates the voltage across the input coils of the magnetic amplifiers 102 that in turn transmits a preselected signal to the pulse transformers 104. The magnetic amplifiers 102 thus drive the pulse transformers 100 which, in turn, send the pulses to the gates of the SCRs 106 to regulate the current flow through the SCRs and thus the speed of the motors 72 and 74. As previously discussed, the bias coils 114 provide a negative control that prevents the motors from running except when the desired amount of positive control is exercised by the control circuit. In the event the bias control fails, the control relay CR7 is deenergized to open contacts CR7 in line 176 and thus open the contacts CR6 in lines 84, 86 and 88 and thus open the rotor circuits.

By changing the voltage across the input coils of magnetic amplifiers 102 and speed of the motors 72 and 74 and the speed of the envelope machine can be smoothly changed. When a torque is imparted on the motors by the friction of the machine components or by processing envelope blanks therethrough, any decrease in the speed of the motors increases the voltage across the coils of the magnetic amplifiers 102. This is accomplished by a feed-back of the rotor voltage and the rotor voltage increases as the speed of the motors decreases to thus increase the feed-back voltage to the speed control circuits 100. The feed-back voltage in line 184 combines with the control circuit voltage in line 120 and the proportional part of the voltage picked up by the wiper arm 110 either increases or decreases with motor speed. Thus the feed-back voltage serves as a self-regulating device to maintain substantially the same speed through a wide range of torque on the motors 72 and 74.

When the machine is deenergized, the switch 158 is opened to deenergize control relay CR6 that in turn opens the contact CR6 in lines 84, 86 and 88 to open the rotor circuits of motors 72 and 74. It should be noted, however, that contacts CR4 remain closed until contacts CR6 first open. With this arrangement the motors first stop before the rotors are electrically disconnected from each other. This maintains the rotors in substantial alignment so that minimum realignment is required before the machine is again energized.

It will be appreciated that other apparatus could be employed to synchronize the rotors prior to electrically connecting the rotors to each other as, for example, providing indices on the rotors and manually positioning the rotors in aligned relation. Also, other types of control devices may be employed as a substitute for the silicon controlled rectifiers.

According to the provisions of the patent statutes, we have explained the principle, preferred construction and mode of operation of our invention and have illustrated and described what we now consider to represent its best embodiment. However, it should be understood that, within the scope of the appended claims, the invention may be practiced otherwise than as specifically illustrated and described.

We claim:
1. A drive mechanism for an envelope machine comprising,
a plurality of separate electric motors mounted on separate sections of an envelope machine,
said electric motors drivingly connected to separate groups of components on said envelope machine and arranged to drive said different groups of components on said envelope machine in preselected timed relation to the other groups of components on said envelope machine, and
means to electrically synchronize said plurality of separate electric motors so that all of said components in all of said groups are driven by said motors in timed relation to each other for forming envelopes from envelope blanks by serially subjecting said envelope blanks to envelope forming operations by all of said components in said separate groups.

2. A drive mechanism for an envelope machine as set forth in claim 1 in which said plurality of electric motors comprises,
a first motor arranged to drive a first group of components on said envelope machine,
a second motor arranged to drive the remaining components on said envelope machine, and
means to electrically synchronize both of said motors.

3. A drive mechanism for an envelope machine as set forth in claim 2 in which,
both of said electric motors are wound rotor motors, and
means electrically connecting the rotors of said wound rotor motors so that both of said rotors remain in substantial angular alignment while driving all of said components in both of said groups.

4. A drive mechanism for an envelope machine as set forth in claim 2 which includes,
other electrical synchronizing means to rotate one of said rotors while the rotors are electrically disconnected to angularly align said rotors.

5. A drive mechanism for an envelope machine as set forth in claim 3 which includes,
resistors and current flow control means connected in series in a rotor circuit,
said current flow control means arranged to regulate the current flow through said rotors and the speed of said motors.

6. A drive mechanism for an envelope machine as set forth in claim 5 which includes,
a speed control circuit operable to control said current flow control means and thereby control the speed of either one or both of said motors.

7. A drive mechanism for an envelope machine as set forth in claim 5 in which said current flow control means comprises solid state rectifiers connected in series with said resistors.

8. A drive mechanism for an envelope machine as set forth in claim 4 in which said speed control circuit includes,
a source of control current for a manually operated potentiometer,
a magnetic amplifier having input coils connected to the wiper arm of said potentiometer,
a pulse transformer having an input coil connected to the output coils of said magnetic amplifier,
said pulse transformer having output coils connected to the gates of said silicon controlled rectifiers in said rotor circuit, said magnetic amplifier and pulse transformer arranged to control through said gates the current flowing through said silicon controlled rectifiers in said rotor circuit.

9. A drive mechanism for an envelope machine as set forth in claim 8 which includes,
a biasing circuit connected to said magnetic amplifiers and said source of current for said speed control circuit,
means in said biasing circuit to maintain said rotor circuit open until current is provided for said speed control circuit.

10. A drive mechanism for an envelope machine as set forth in claim 3 in which,
said synchronizing means includes synchronizers mechanically connected to said motor rotors,
means electrically connecting said synchronizers to each other so that a voltage is generated by one of said synchronizers when there is an angular deviation between said rotors of said wound rotor motors, and
means associated with said synchronizers arranged to maintain the electrical connection between the rotors of said motors open until said rotors are substantially aligned with each other.

11. A drive mechanism for an envelope machine as set forth in claim 6 which includes,
a feed-back voltage from said rotors to said speed control circuit,
said feed-back voltage arranged to maintain the speed of said motors as said motors are subjected to torque by said machine.

* * * * *